United States Patent [19]
Terasaki et al.

[11] Patent Number: 5,746,643
[45] Date of Patent: May 5, 1998

[54] METHOD OF GRINDING AND MACHINING NON-CIRCULAR WORKPIECE AND APPARATUS FOR THE SAME

[75] Inventors: Fumitoshi Terasaki, Kani; Kenji Yoshimura; Tatsuhiro Yoshimura, both of Komaki, all of Japan

[73] Assignee: Okuma Corporation, Aichi-ken, Japan

[21] Appl. No.: 621,474

[22] Filed: Mar. 25, 1996

[30] Foreign Application Priority Data

Mar. 23, 1996 [JP] Japan .................................. 7-064380

[51] Int. Cl.$^6$ ................................................. B24B 49/04
[52] U.S. Cl. .......................... 451/5; 451/228; 451/62; 451/49
[58] Field of Search .......................... 451/62, 49, 5, 451/9, 11, 14, 251

[56] References Cited

U.S. PATENT DOCUMENTS

| | | | |
|---|---|---|---|
| 4,905,418 | 3/1990 | Wedeniwski | 451/62 |
| 5,251,405 | 10/1993 | Clauss et al. | 451/5 |
| 5,289,660 | 3/1994 | Terasaki et al. | 451/5 |

FOREIGN PATENT DOCUMENTS

| | | |
|---|---|---|
| 2-41846 | 2/1990 | Japan . |
| 4-331059 | 11/1992 | Japan . |
| 5-301154 | 11/1993 | Japan . |

Primary Examiner—Robert A. Rose
Attorney, Agent, or Firm—Lahive & Cockfield, LLP

[57] ABSTRACT

The present invention achieves machining operation without grind-burning and grinding crack and improves the profile accuracy of a workpiece, by automatically generating X/C axis data that controls the headstock and the wheel spindle head while taking into account speed, acceleration, change in acceleration and contact arc length. Storage means 33 for storing the time taken by the workpiece to make one turn, reference X/C axis data computing element 53 for computing machining data from given angle and a set of lift points to control the grinding peripheral speed constant within a range where the machine can follow, computing element 56 for computing contact arc during grinding from the X/C axis data, storage means 53 for storing limitation value of X axis based on the contact arc while changing it according to C axis, computing means 46 for storing said reference X/C axis data and computing speed, acceleration and change in acceleration while reading the reference X/C axis data by skipping a specified number of steps, and modifying element 57 for reducing said number of steps to bring the speed, acceleration and change in acceleration within limits when any of these values exceeds the limit are provided, thereby to carry out synchronous control of the work spindle rotation and reciprocal motion of the wheel spindle head according to the modified X/C axis data.

2 Claims, 6 Drawing Sheets

METHOD OF GRINDING AND MACHINING NON-CIRCULAR WORKPIECE AND APPARATUS FOR THE SAME

BACKGROUND OF THE INVENTION

1. Field of the Invention

The present invention relates to a method of grinding and machining a non-circular workpiece with high accuracy and high efficiency, and also to an apparatus for the same.

2. Description of the Related Art

A grinding machine, whereon a non-circular workpiece, such as a cam, is machined under synchronous control of work spindle rotation and feed movement of a wheel spindle head which is provided with a grinding wheel, requires control data of rotating angle of the work spindle and feed position of the wheel spindle head (hereinafter called the X/C axis data).

The X/C axis data representing the rotating angle of the work spindle and feed position of the wheel spindle head are prepared from the distance between the center of rotation and periphery of the workpiece and profile data (lift data) which is determined from the angle of a line segment that represents the distance for a whole circumference of the workpiece, while taking into account the diameter of the grinding wheel used in the grinding operation and the time required for the workpiece to rotate one revolution. Machining operation is carried out based on this data. In general, because profile error increases when the wheel spindle head moves with higher acceleration, such data is prepared so that the wheel spindle head moves with a low acceleration. At a portion where the rate of grinding the workpiece (hereinafter called the peripheral speed) suddenly increases, resistance against the grinding motion increases to cause the workpiece to deform, resulting in a profile error. The data is prepared so that the X and C axes move at lower speeds, in order to reduce the stock removal per unit time in such a case.

This will be described in the following by taking cam grinding operation as an example. When grinding the lift portion of a cam, the wheel spindle head moves with a higher acceleration and therefore the wheel spindle head system is deformed or follow-up error in the servo system increases, resulting in increased machining error. For this reason, the X/C axis data must be prepared in such a way that the wheel spindle head moves slowly. Also because the peripheral speed suddenly increases at the lift portion, stock removal per unit time shows an excessive increase to cause the workpiece to deform, thus resulting in some portions left non-ground which lead to profile errors. This also requires it to prepare such X/C axis data that makes the wheel spindle stock move slower and less amount of metal removed per unit time. Thus two factors have been making it necessary to reduce the speed by means of X/C axis data in the previous art.

In order to solve this problem, the inventors proposed the art described in the JAPANESE PATENT LAYING OPEN GAZETTE No. 5-301154. According to the art, X/C axis data is prepared in advance so that the periphery of a cam can be ground at a constant and sufficiently slow grinding rate, and new X/C axis data is prepared by reading said X/C axis data while skipping specified number of steps. At this time, the speed, acceleration and change in acceleration are calculated to see if they fall within specified limits. If they do not fall within the limits, the number of steps which are skipped is reduced and accordingly modified X/C axis data is prepared. The X/C axis data used in grinding operation is prepared in this way.

Figure 7A:
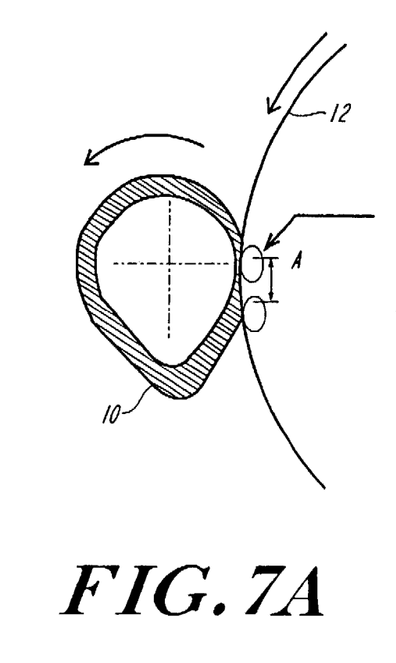
FIGS. 7(a) and 7(b) shows changes in the contact arc of a non-circular workpiece.
Figure 7B:
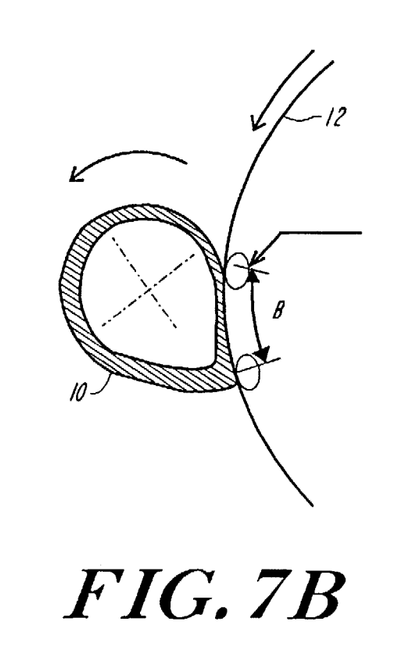

However, even when the X/C axis data is prepared with the acceleration of the wheel spindle head and peripheral speed taken into consideration, there may arise a case where the workpiece experiences grind-burning and/or grinding crack. Such a trouble occurs when contact arc during grinding is not taken into account. The contact arc refers to the length of chip removed from the workpiece by one abrasive particle while the grinding wheel rotates one revolution. In the case of the non-circular workpiece, such as a cam, the contact arc changes with the rotating angle of the workpiece, even if such a method of grinding is employed that keeps the peripheral speed constant. When compared to the contact arc A in the case of grinding a portion where the distance between the center of rotation and the periphery remains the same (a), the contact arc B is far longer when grinding a portion where the distance between the center of rotation and the periphery changes (b), while grinding the same cam as shown in FIG. 7. At this portion where the contact arc suddenly increases, work done by one abrasive particle increases thereby to cause more grinding heat to be generated, resulting in grind-burning and grinding cracks. Under such conditions, abrasive particles receive increased load which leads to shorter service life of the grinding wheel.

With the X/C axis data being prepared as described above, it must be determined to see whether the rate of decreasing the grinding speed is appropriate or not by trial and error based on the result of grinding operation. When grind-burning or grinding crack is found on the ground surface, for example, change in the length of contact arc is estimated from the position where the trouble occurred thereby to determine whether the rate of decreasing the grinding speed is appropriate or not. If it is not appropriate, the X/C axis data must be calculated again under different conditions, followed by retrial of machining operation with the new data. Thus the operation has been requiring very tedious and time-consuming works.

SUMMARY OF THE INVENTION

The present invention aims at solving the problems described above. Objects of the invention are to make it possible to automatically generate X/C axis data that controls the headstock and the wheel spindle head while taking into consideration the length of contact arc as well as the grinding speed, acceleration and change in acceleration without such tedious works as described above, to machine the workpiece with a high accuracy in a shorter time, and to maintain a good machining accuracy for an extended period of time by minimizing damage to the grinding wheel.

In order to solve the problems described above, the invention provides a method of grinding a non-circular workpiece through control of the rotation of work spindle and reciprocal movement of wheel spindle head according to X/C axis data which represents work spindle rotating angle and wheel spindle head position generated from profile data representing non-circular configuration of the workpiece, grinding wheel diameter and time taken by the workpiece to make one revolution, wherein the X/C axis data is read while skipping a specified number of steps to compute speed, acceleration, change in acceleration and the contact arc between the workpiece and the grinding wheel during grinding operation, thereby to control the work spindle rotation and reciprocal movement of the wheel spindle head by using modified X/C axis data generated by comparing the computed values with limit values of the speed, acceleration, change in acceleration and the length of contact arc which have been stored in advance and, when any of the computed values exceeds the limit, reducing said number of steps so that the value falls within the limit.

The invention also provides a grinding machine for machining a non-circular workpiece by generating X/C axis data which represents the rotating angle of the work spindle and feed position of the wheel spindle head from profile data representing the non-circular configuration, grinding wheel diameter and the time taken by the workpiece to rotate one revolution. The grinding machine includes storage means for storing the time taken by the workpiece to rotate one revolution, reference X/C axis data computing means for computing machining data from given angle and a set of lift points thereby to control the grinding peripheral speed constant within a range where the machine can follow, computing means for storing said reference X/C axis data and computing speed, acceleration, change in acceleration and contact arc length by reading the reference X/C axis data while skipping a specified number of steps, and modifying means for reducing said number of steps to bring the speed, acceleration, change in acceleration and contact arc length within limits when any of these values exceeds the limit.

Profile data which describes the configuration of a non-circular workpiece is given by the distance between the center of rotation and the periphery and data obtained from the angle of a line segment that represents the distance for a whole circumference of the workpiece. Then such a set of a points that divide the profile, which is generated by smooth tracing of the profile data, into tiny segments of the same length is obtained. Spindle angles and wheel spindle head positions when the grinding wheel makes contact with these points are taken as reference X/C axis data. The reference X/C axis data is generated in such a way as the grinding machine operates with a speed, acceleration and change in the acceleration which are sufficiently smaller than the highest values the machine can follow, so that the grinding speed on the workpiece periphery remains constant.

Then new X/C axis data is generated by sampling the reference X/C axis data at intervals of specified number of steps. The grinding speed is determined from the position data determined one step before and the position data now being determined, acceleration is obtained from the position data determined two steps before, position data determined one step before and the position data now being determined, and change in acceleration is obtained from the position data determined three steps before, the position data determined two steps before, position data determined one step before and the position data now being determined.

Contact arc at this time is determined from the newly generated X/C axis data. When any of the speed, acceleration, change in the acceleration and contact arc exceeds its limitation, computation is done over by reducing the number of steps used to determine the position data now being determined. By repeating this process, modified X/C axis data is generated that allows the grinding speed to remain almost constant over the periphery of the workpiece and the speed, acceleration and change in the acceleration to fall within the limits which the machine can follow.

Moreover, because the length of contact arc during grinding operation is taken into consideration, grinding resistance remains almost constant, so that highly accurate products without grind-burning and grinding cracks can be machined without need of professional knowledge on machining data preparation. Also because fluctuation of the force exerted on the grinding wheel is decreased, service life of the grinding wheel is elongated making another factor of maintaining the product accuracy.

DESCRIPTION OF THE PREFERRED EMBODIMENT

Figure 1:
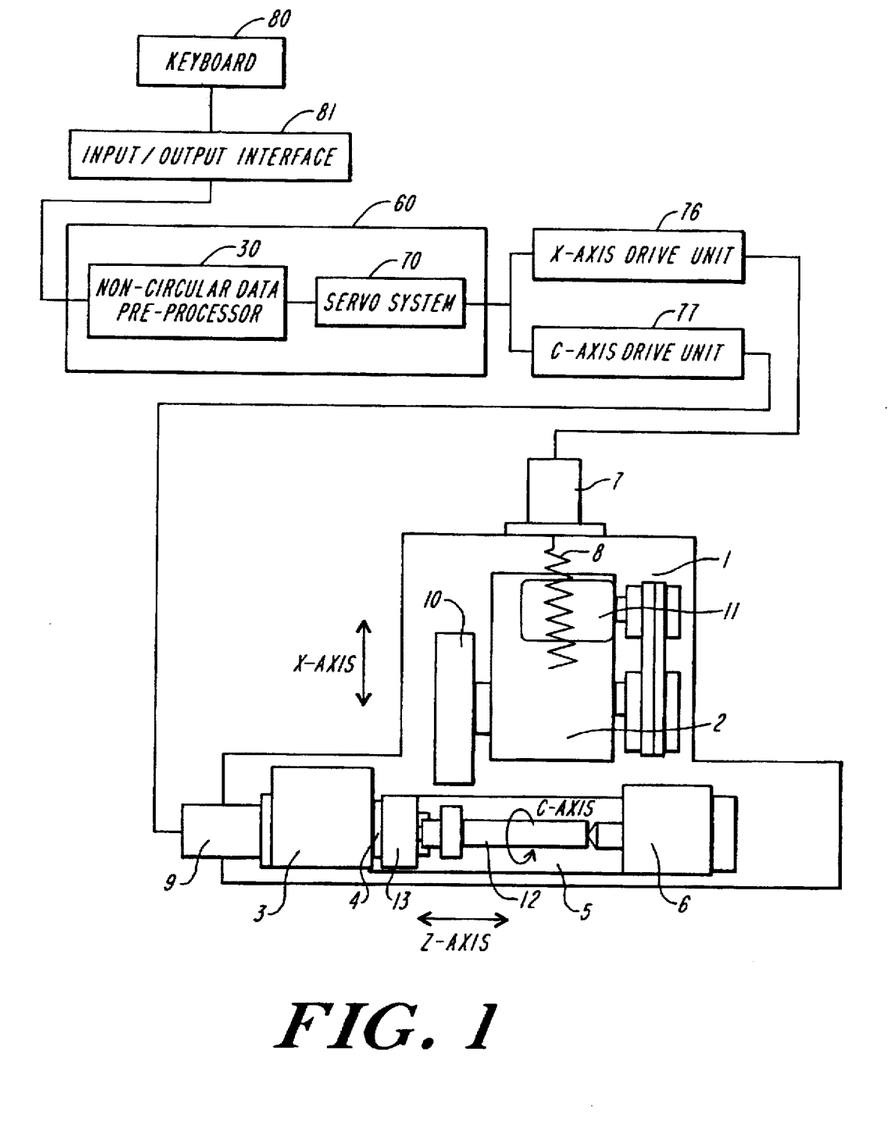
FIG. 1 shows the constitution of the numerically controlled grinding machine.

An embodiment of the invention will be described below by referring to FIGS. 1 through 8B. FIG. 1 is a plan view of an NC grinding machine to which the invention is applied. A wheel spindle head 2, which is guided movably back and forth with respect to a workpiece, is located behind a bed 1. The wheel spindle head 2 can be moved and positioned via a ball screw 8 driven by an X-axis servo motor 7 which is mounted on the bed 1. Mounted on the wheel spindle head 2 is a grinding wheel 10 which is driven to rotate by a motor 11.

In front of the bed 1, a table 5 is movably mounted on a slideway installed in Z axis direction, and a work spindle head 3 and a footstock 6 are fixed on the table 5 with the mounting positions thereof being adjustable. A work spindle 4 is rotatably supported on the work spindle head 3, while the work spindle 4 is driven to rotate by a C axis servo motor 9 mounted on the work spindle head 3. A workpiece 12 is supported by a chuck 13 fixed at the tip of the work spindle 4 and the footstock 6, so that rotation of the work spindle 4 is transmitted to the workpiece 12 without slippage.

Figure 2:
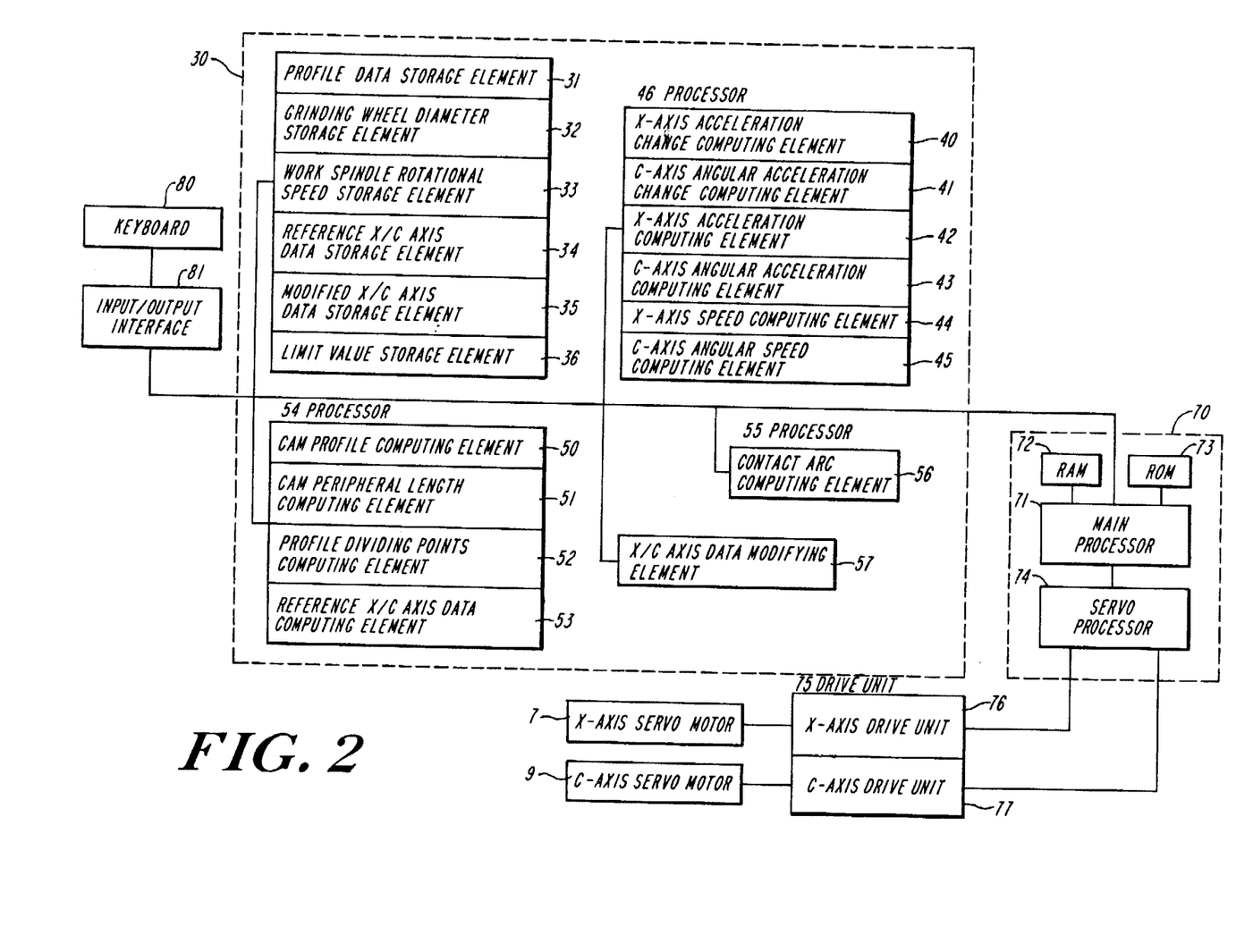
FIG. 2 shows electrical constitution of one embodiment of the numerically controlled grinding machine according to the invention.

FIG. 2 shows the constitution of a non-circular data pre-processor 30 and a servo system 70 of a numerical control unit 60 that controls the axes of the NC grinding machine. A RAM 72 installed in the servo system 70 stores part programs and parameters of control axes, and a ROM 73 stores axis control software which is read when power of the machine is turned on. These data are processed by a main processor 71. A servo processor 74 mainly processes the acceleration and deceleration control upon receiving axis movement command from the main processor 71 and gives a command of axis movement to a drive unit 75. The drive unit 75 supplies electric power to drive the servo motor of each axis.

The non-circular data pre-processor 30 computes the X/C axis data from the non-circular profile data by taking into account the grinding wheel diameter and the time required by the workpiece to rotate one revolution. The non-circular data pre-processor 30 also has a function of generating X/C axis data which is modified so that the speed, acceleration and change in the acceleration of the spindle and the wheel spindle head fall within the limits which the machine can follow thereby to make the grinding speed on the workpiece periphery approach a specified value and the length of contact arc does not show sudden change.

A profile data storage element 31 stores profile data which represents a non-circular configuration, a grinding wheel diameter storage element 32 stores the diameter of the grinding wheel, a spindle rotational speed storage element 33 stores the time required by the workpiece to make one revolution during machining, a reference X/C axis data storage element 34 stores the reference X/C axis data which represents the wheel spindle head position and the work spindle angle when the workpiece and the grinding wheel are brought into contact, a modified X/C axis data storage element 35 stores the X/C axis data which has been modified so that the speed, acceleration and change in the acceleration of the work spindle and the wheel spindle head fall within the predetermined limits, and a limit value storage element 36 stores the limit values of the speed, acceleration and change in the acceleration of the work spindle and the wheel spindle head, with these elements being installed in the RAM 37.

A cam profile computing element 50 converts the given angles and the set of lift points to profile data, a cam peripheral length computing element 51 computes the length of the profile, a profile dividing points computing element 52 divides the determined profile into tiny segments of the same length, and a reference X/C data computing element 53 computes the wheel spindle head position and the work spindle angle when the workpiece and the grinding wheel are brought into contact, these elements being installed in the processor 54.

A processor 55 computes the contact arc at the time of grinding, a processor 46 reads the reference X/C axis data while skipping a specified number of steps thereby to compute the speed, acceleration and change in acceleration of each axis, and comprises an X axis acceleration change computing element 40 which computes the speed (angular speed), acceleration (angular acceleration) and change in the acceleration (change in angular acceleration) of X axis and C axis according to the X/C axis data, a C-axis angular acceleration change computing element 41, an X-axis acceleration computing element 42, a C-axis angular acceleration computing element 43, an X-axis speed computing element 44 and a C-axis angular speed computing element 45. An X/C axis data modifying element 57 modifies the data so that the values fall within the limits by reducing the number of steps when any of the computed values of the speed, acceleration and change in the acceleration and the length of contact arc exceed the limit values. Data which is entered through a keyboard 80 is transmitted to the non-circular data pre-processor 30 and the numerical control unit 70 via an input/output interface 81.

Now the operation of the embodiment of the invention will be described below by referring to the flow chart of FIG. 3. In step 1, the reference X/C axis data is read. The reference X/C axis data is generated in the following procedure. Profile data representing the non-circular configuration which has been entered is stored in the profile data storage element 31, and the given angles and the set of lift points are converted by the cam profile computing element 50 into data representing the workpiece profile. The cam circumferential length computing element 51 calculates the circumferential length of the non-circular workpiece from the data. Then a set of points which divide the profile into tiny segments of the same length is determined by the profile dividing points computing element 52. From these points and diameter of the grinding wheel of the grinding wheel storage element 32, the computing element 53 computes the reference X/C axis data which represents the wheel spindle head position and the work spindle angle of the time when the workpiece and the grinding wheel are brought into contact. These data are stored in the reference X/C axis data storage element 34. The reference X/C axis data is generated in such a way as the grinder operates with sufficiently lower speed, acceleration and change in the acceleration than the highest values the machine can follow, so that the grinding speed on the workpiece periphery remains constant.

Then in step 2, the X/C axis data modifying element 57 determines the number of steps used in generating the new X/C axis data from the time taken by the workpiece to make one revolution during machining which is stored in the spindle rotational speed storage element 33 and the time taken by the workpiece to make one revolution during machining with the reference X/C axis data, and generates new X/C axis data for one element while skipping the specified number of steps with which the reference X/C axis data was determined.

In step 3, X axis speed of the new X/C axis data is computed in the X-axis speed computing element 44 and angular speed of C axis of the new X/C axis data is computed in the C-axis angular speed computing element 45. In step 4, it is checked to see if the X-axis speed and the C-axis angular speed of the new X/C axis data which has been determined exceed the limits thereof. If either of them exceeds the limit (YES), the speed is decreased in step 5 and the X-axis speed and the C-axis angular speed of the new X/C axis data are computed again in step 3, followed by checks to see if they exceed the limits again in step 4. The speed reduction process in step 5 is to decrease the number of steps which are skipped in step 2 and generate new X/C axis data again.

If the X-axis speed and the C-axis angular speed do not exceed the speed limits (NO), X axis acceleration of the new X/C axis data is computed in the X-axis acceleration computing element 42 and angular acceleration of C axis is computed in the C-axis angular acceleration computing element 43. In step 7, it is checked to see if the X-axis acceleration and the C-axis angular acceleration of the new X/C axis data which has been determined exceed the limits of acceleration. If either of them exceeds the limit (YES), the acceleration is decreased in step 8 and the X-axis acceleration and the C-axis angular acceleration of the new X/C axis data are computed again in step 6, followed by checks to see if they exceed the limits again in step 7. The process of decreasing the acceleration in step 8 is carried out in a method similar to that of speed reduction process.

If the X-axis acceleration and the C-axis angular acceleration do not exceed the limits of acceleration (NO), change in X axis acceleration of the new X/C axis data is computed in the X-axis acceleration change computing element 40 and change in angular acceleration of C axis is computed in the C-axis angular acceleration change computing element 41. In step 10, it is checked to see if the change in X-axis acceleration and the change in C-axis angular acceleration of the new X/C axis data which has been determined exceed the limits of changes in acceleration. If either of them exceeds the limit (YES), the change in acceleration is decreased in step 8 and the change in X-axis acceleration and the change in C-axis angular acceleration of the new X/C axis data are computed again in step 9, followed by checks to see if they exceed the limits of acceleration again in step 10. The process of decreasing the changes in acceleration in step 11 is carried out in a method similar to the speed reduction process and the acceleration reduction process in step 5 and step 8.

If the change in X-axis acceleration and the change in C-axis angular acceleration do not exceed the limits of changes in acceleration (NO), the contact arc computing element 56 computes the length of contact arc from the new X/C axis data and the grinding wheel diameter stored in the grinding wheel diameter storage element 32 (procedure of computing the contact arc will be described later). In step 13, if the length of contact arc which has been determined exceeds the limit of contact arc (YES), contact arc reduction process is carried out in step 14, and the length of contact arc of new X/C axis data is computed again in step 12, followed by checks to see if the length of contact arc exceeds the limit again in step 13. The process of decreasing the length of contact arc is also carried out in a method similar to the speed reduction process, the acceleration reduction process and acceleration change reduction process in step 5, step 8 and step 11.

In case the length of contact arc does not exceed the limit (NO), the new X/C axis data under this condition is stored as modified X/C axis data in the modified X/C axis data storage element 35 in step 15. In step 16, it is checked to see if modified X/C axis data for the whole circumference of the workpiece has been generated or not. If the data for all segments has not been completed (NO), number n is incremented as n=n+1 in step 17 and the process returns to step 2 where the process of generating the modified X/C axis data is repeated for the next segment. If the data has been completed (YES), the process of generating modified X/C axis data for the whole circumference is completed.

Figures 4, 5:
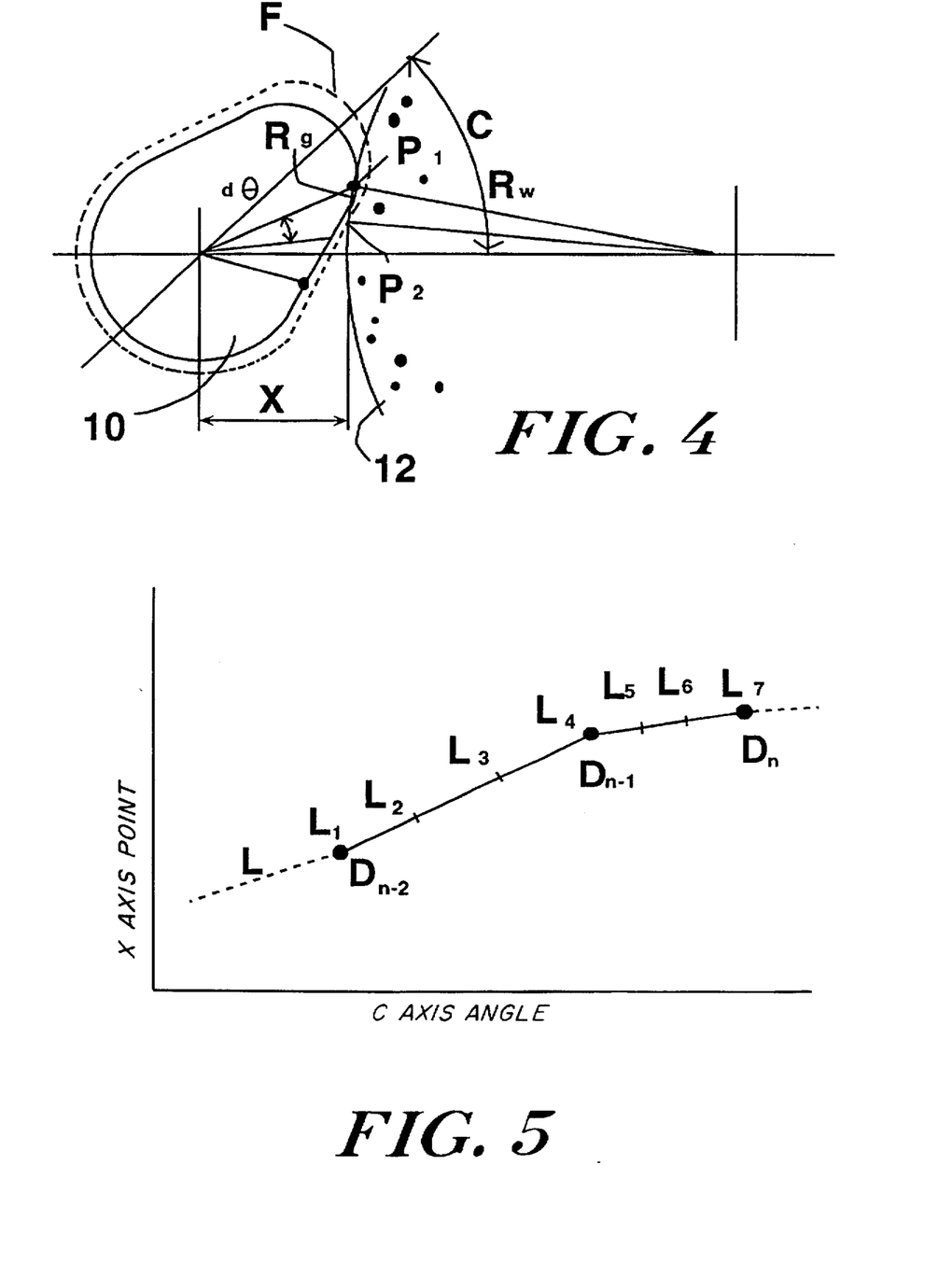
FIG. 4 shows the method of determining contact arc.
FIG. 5 shows a curve representing the rotating angle of the work spindle and reciprocal motion of the wheel spindle head.

Now the procedure of computing the contact arc will be described below by referring to FIG. 4.

By using the new X/C axis data determined in step S2, point $P_1$ where the grinding wheel 10 and the workpiece 12 contact with each other can be determined. From the point $P_1$, previous profile F departing by the thickness removed while the workpiece 12 made one turn is determined, then an intersect $P_2$ of the profile F indicated by dashed line and a circle Rw having the radius of the grinding wheel is determined. The intersect $P_2$ and the point $P_1$ where the grinding wheel 10 makes contact with the workpiece 12 are connected to obtain an arc Rg. The length of contact arc can be approximately determined by multiplying the arc Rg and the moving angle dθ of the C-axis data.

Methods of decreasing the calculated values of speed, acceleration, change in acceleration and length of contact arc to bring them within the limits will be described below by taking a process of decreasing the length of contact arc as an example while referring to FIGS. 5 and 6. FIG. 5 shows an example of curve representing the reference X/C axis data. $L_1, L_2, L_3, L_4, \ldots, L_7$ indicate the reference X/C axis data. $D_{n-2}, D_{n-1}, D_n$ are modified X/C axis data. In this example, modified X/C axis data is stored up to $D_{n-1}$ from the new X/C axis data obtained by skipping three steps while reading the reference X/C axis data, in order to generate modified X/C axis data Dn for the next segment.

Figure 3:
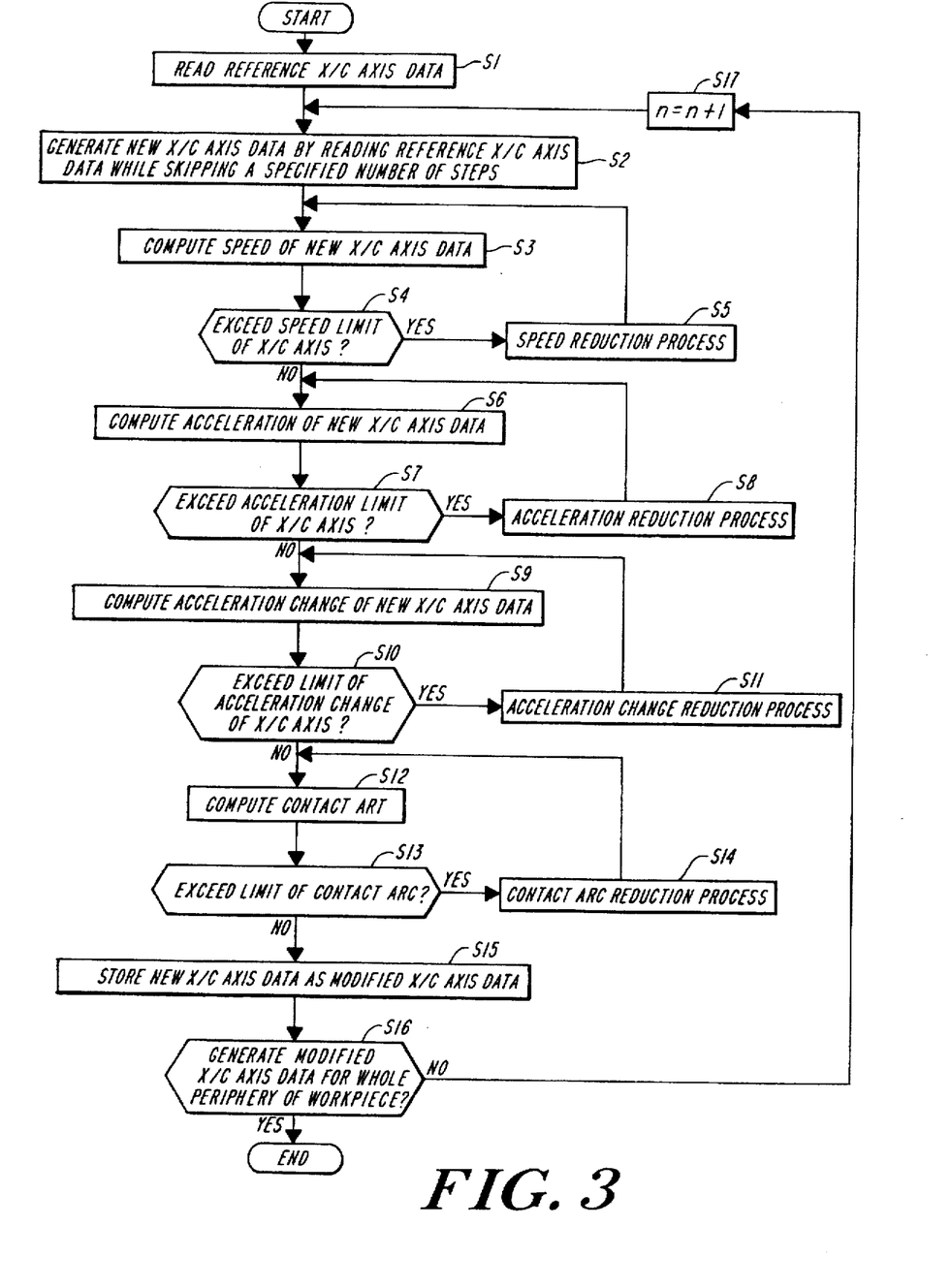
FIG. 3 is a flow chart showing the operation of computing modified X/C axis data in one embodiment of the invention.
Figure 6:
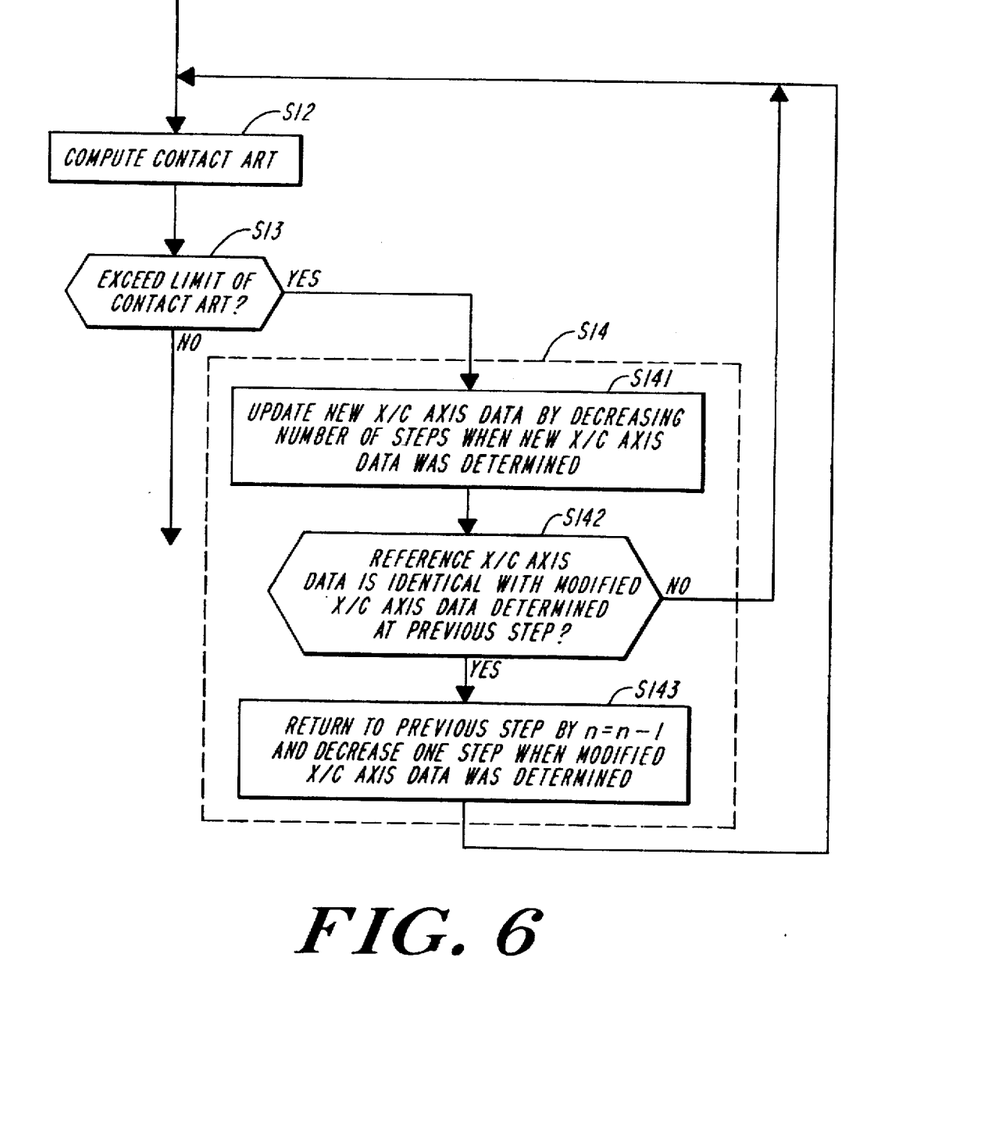
FIG. 6 is a flow chart showing specific operations of acceleration reduction process in one embodiment of the invention.

FIG. 6 shows the process of step 14 of FIG. 3 in detail, where $L_7$ in step 2 is taken as new X/C axis data of Dn. In step 12, length of contact arc between $D_{n-1}$ and $D_n$ is determined to check to see if the length of contact arc exceeds the limit in step 13. If the length of contact arc exceeds the limit (YES), number of steps is reduced from the specified number of 3 in step 141 to 2 in the contact arc reduction process of step 14, taking $L_6$ as new X/C axis data of Dn. In S142, it is checked to see if $D_n$ given by the new X/C axis data is identical with $D_{n-1}$ or not. In this case because they are not identical with each other as $L_4 \neq L_6$ (NO), the process returns to step 12 where the contact arc reduction process comes to end.

In step 12, length of contact arc is determined again to check to see if the calculated length of contact arc falls within the limit or not in step 13.

In case the length of contact arc exceeds the limit in step 13 and the new X/C axis data of Dn becomes identical with the immediately foregoing modified X/C axis data Dn-1 as a result of the contact arc reduction process for reducing the number of repeated steps, namely $D_{n-1}=D_n=L_4$ in this case, the immediately foregoing modified X/C axis data $D_{n-1}$ is remade. It is confirmed that $D_n$ and $D_{n-1}$ are identical (YES) in step 142, number n is decremented (n=n-1) to delete the immediately foregoing modified X/C axis data which was stored and the number of steps used in determining this data is decreased by 1 to generate new X/C axis data of $D_{n-1}$ as $L_3$ in step 143, and the process returns to step 12 where the length of contact arc between $D_{n-2}$ and $D_{n-1}$ is determined and it is checked to see if the length of contact arc determined in step 13 is within the limit. In case the contact arc length of the new X/C axis data of Dn-1 falls within the limit (YES), operations following step 15 of FIG. 5 are continued to store $L_3$ of the new X/C axis data as the immediately foregoing modified X/C axis data $D_{n-1}$ and, in the case of this example, the next modified X/C axis data is generated from the new X/C axis data $L_6$ and the specified number of steps 3.

In case the contact arc length of the new X/C axis data of Dn-1 still exceeds the limit (NO) in step 13, number of steps is decreased again in step 141. In this example, the new X/C axis data of $D_{n-1}$ is set as $L_2$ followed by repetition of contact arc reduction process similar to those described above.

As described above, modified X/C axis data is successively generated to determine modified X/C axis data for a whole periphery of the workpiece which is stored in the modified X/C axis data storage element 35. This data is used to control the rotary motion of the work spindle and the reciprocal motion of the wheel spindle head, thereby to machine the non-circular workpiece.

Similar effect can be achieved by performing these functions in separate computing devices, and therefore it is not necessarily required to provide these functions in the numerical control unit.

According to the first structure of the invention, as described in detail above, because the grinding operation is controlled so that the speed, acceleration and change in acceleration of the work spindle and the wheel spindle head do not exceed the limits while taking into account the change in the contact arc during grinding according to the data obtained by setting the grinding speed constant over the periphery of a non-circular workpiece, grinding resistance becomes almost constant during grinding of the non-circular workpiece with minimum portion being left non-ground, thus achieving an excellent effect of machining highly accurate products without grind-burning and grinding crack. Also because the force exerted on the grinding wheel does not experience significant fluctuation, the invention provides excellent effects of elongating the service life of grinding wheel and maintaining the machining accuracy.

According to the second structure of the invention, because such X/C axis data is generated that the speed, acceleration and change in acceleration of the spindle and the wheel spindle head do not exceed the limits while taking into account the change in the contact arc during grinding, high precision machining operation with minimum portion being left non-ground without grind-burning and grinding crack can be performed easily and accurately under numerical control.

What is claimed is:

1. A method of grinding a non-circular workpiece comprising generating X/C axis data representative of work spindle rotating angle and wheel spindle head position from profile data representative of non-circular configuration of the workpiece, grinding wheel diameter and time required by the workpiece to make one revolution, and control of the work spindle rotation and reciprocal movement of the wheel spindle head, reading the X/C axis data while skipping a specified number of data points from which said X/C axis data is computed in order to compute speeds, accelerations and changes in acceleration of the work spindle and the wheel spindle head and the contact arc between the workpiece and the grinding wheel during grinding operation, thereby controlling rotation of the work spindle and reciprocal movement of the wheel spindle head by using modified X/C axis data generated by comparing the computed values with limit values of the speed, acceleration, change in acceleration and the length of contact arc which have been stored in advance and, when any of the computed values exceeds the limit values, reducing said specified number of data points from which said axis data is computed so that the value falls within the limit values.

2. A grinding machine for machining a non-circular workpiece by generating X/C axis data which is representative of the rotating angle of a work spindle and the feed position of a wheel spindle head from profile data representative of the non-circular configuration, grinding wheel diameter and the time taken by the workpiece to make one revolution, said grinding machine comprising storage means for storing the time taken by the workpiece to make one revolution, reference X/C axis data computing means for computing machining data from a given angle and a set of lift points to control the grinding peripheral speed constant within a range which the machine can follow, computing means for storing said reference X/C axis data and computing speed, acceleration, change in acceleration and contact arc length by reading the reference X/C axis data computed by said reference X/C axis computing means while skipping a specified number of data points from which said axis data is computed, and modifying means for reducing said number of specified points from which said axis data is computed to bring the speed, acceleration, change in acceleration and contact arc length within limit values when any of these values exceeds the limit value, wherein machining operation is performed by synchronous control of the work spindle rotation and reciprocal movement of the wheel spindle head according to X/C axis data which takes the contact arc into account.

* * * * *